June 3, 1924.  1,496,033
A. SPEIZER
FAUCET AND RETAINER THEREFOR
Filed July 26, 1922  2 Sheets-Sheet 1
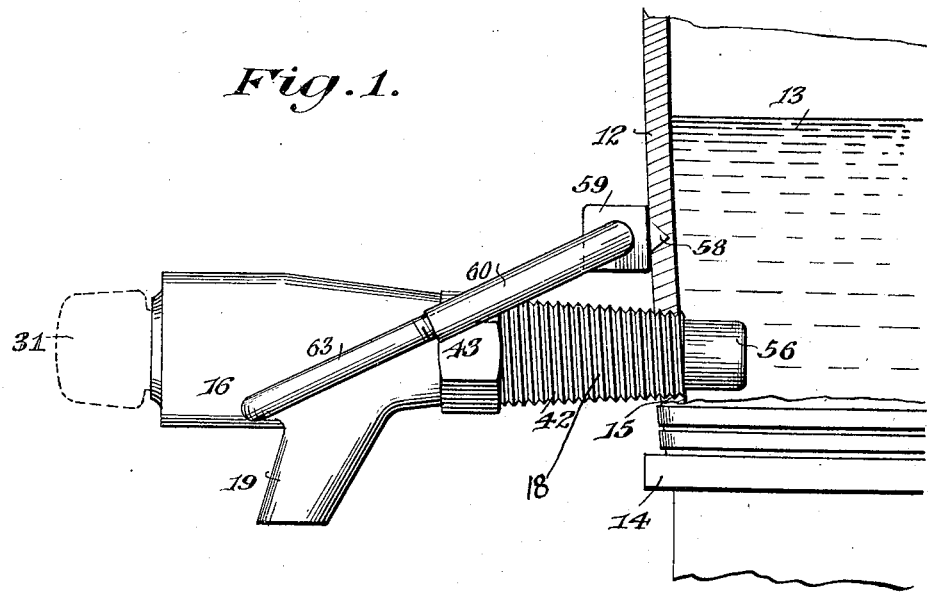
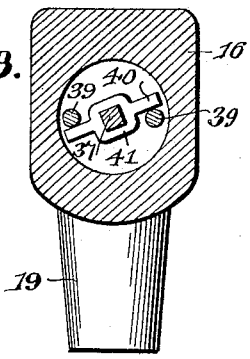
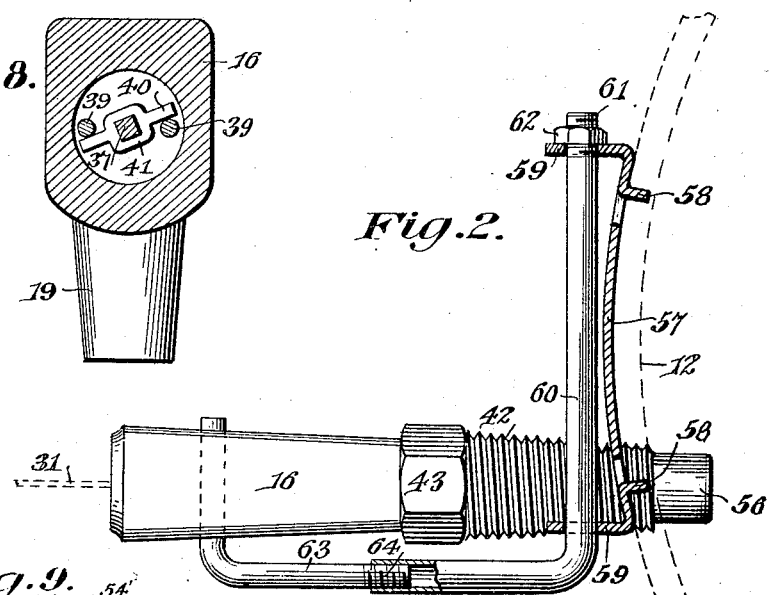
Arthur Speizer, INVENTOR.
BY
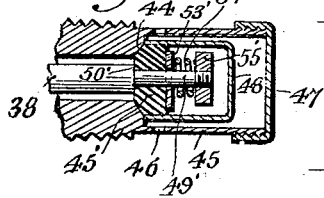
ATTORNEY.

June 3, 1924.
A. SPEIZER
1,496,033
FAUCET AND RETAINER THEREFOR
Filed July 26, 1922    2 Sheets-Sheet 2
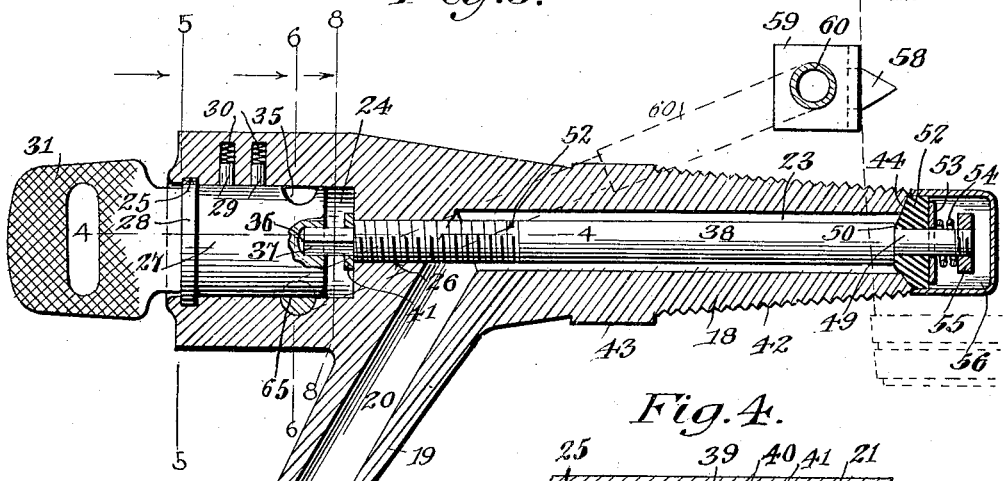
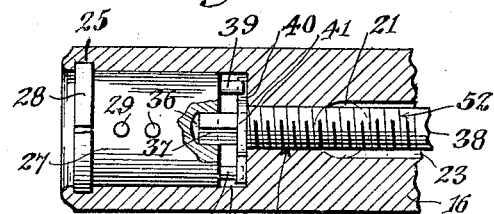
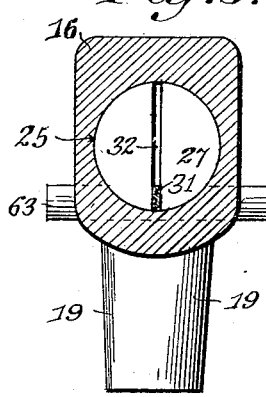 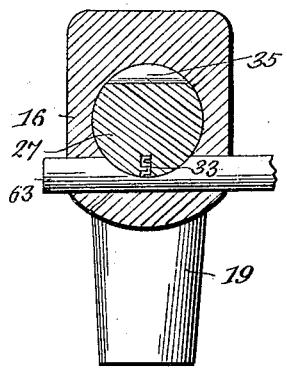 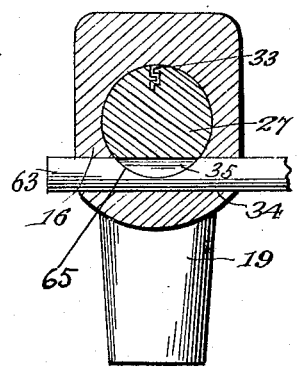
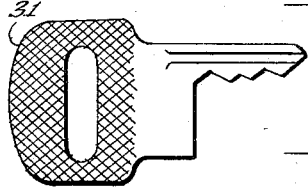
Arthur Speizer, INVENTOR.
BY Geo. P. Kimmel ATTORNEY.

Patented June 3, 1924.

1,496,033

UNITED STATES PATENT OFFICE.

ARTHUR SPEIZER, OF FARRELL, PENNSYLVANIA.

FAUCET AND RETAINER THEREFOR.

Application filed July 26, 1922. Serial No. 577,690.

*To all whom it may concern:*

Be it known that I, ARTHUR SPEIZER, a citizen of the United States, residing at Farrell, in the county of Mercer and State of Pennsylvania, have invented certain new and useful Improvements in Faucets and Retainers Therefor, of which the following is a specification.

This invention relates to a combined faucet and retainer therefor and has for its object to provide a device of such class with means, in a manner as hereinafter set forth, for locking the faucet to prevent the same being opened and used surreptitiously or by unauthorized persons.

A further object of the invention is to provide a faucet with a retainer device coupled therewith, and which is adapted to be connected to the container through which the faucet is attached, for the purpose of securing the latter to the container, thereby preventing the faucet from being removed or unscrewed from the container until the retaining device is released, and to further provide a locking element, common to the faucet and retainer device to prevent the faucet from being opened and the retainer device released to enable the faucet to be removed surreptitiously or by an unauthorized person.

Other objects of the invention are to provide a combined faucet and retainer therefor which is comparatively simple in its construction and arrangement, readily set up with respect to a container for the withdrawing of the contents thereof, strong, durable, efficient and convenient in its use, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to, which come within the scope of the claims hereunto appended.

In the drawings wherein like reference characters denote corresponding parts throughout the several views:—

Figure 1 is a side elevation of a combined faucet and retainer therefor, in accordance with this invention, showing the adaptation thereof in connection with a container or receptacle containing a body liquid, Figure 2 is a plan partly in section, Figure 3 is a longitudinal sectional view of the faucet, Figure 4 is a fragmentary section on line 4—4, Figure 3, Figure 5 is a section on line 5—5, Figure 3, Figure 6 is a section on line 6—6, Figure 3, Figure 7 is a cross sectional view through the outer end of the faucet body illustrating the locking mechanism shifted to position opposite with respect to that shown in Figure 6, Figure 8 is a section on line 8—8, Figure 3, Figure 9 is a fragmentary longitudinal sectional view of a modified form of valve construction, Figure 10 is a detail illustrating the key of the locking mechanism.

Referring to the drawings in detail, 12 denotes a container or receptacle in the form of a barrel and which contains a body of liquid 13. The container or receptacle 12 is mounted on a support 14, and is provided with an opening 15, having the wall thereof threaded and which is engaged by a threaded part, to be presently referred to, of the faucet whereby the latter is connected to the container or receptacle 12 for the purpose of withdrawing the liquid 13.

The faucet comprises a body portion including an outer part portion 16, and an inner part or portion 18, which are integral with each other. The outer part 16 is of greater diameter than the inner part 18 and has depending therefrom, at the rear thereof at an outward inclination, an extension 19. The outer part 16 is formed with an inclined bore 20, which is of a length to extend through the extension 19. The inner part 18 is provided throughout the entire length thereof, with a longitudinally extending bore 23, which opens at its forward end into the upper end of the bore 20. The bores 20 and 23 form the outlet or discharge passage of the faucet. The outer part 16 is furthermore provided with an enlarged cylindrical socket 24, opening at the outer terminus of the outer part 16. The side wall of the socket 24, near its outer end, is formed with an annular groove 25, and extending from the inner wall of the socket 24 and opening into the upper end of the bore 20, is a longitudinal bore 26, having the wall thereof threaded. The bore 26 is in alignment with and of less diameter than the bore 23. Arranged within the socket 24 is a locking mechanism, which is employed to prevent the opening of the faucet surreptitiously or by an unauthorized person, and said mechanism comprises a cylindrical element 27, having a peripheral flange 28 which is seated in the groove 25. It will be stated that any suitable form of locking mechanism can be employed, preferably of a permutation type having the cylinder or cylindrical element thereof constructed in the manner as illustrated, so that it will associate with the elements of the faucet to lock and release said elements. Mounted in the outer portion 16 of the faucet and associated with the element 27, are a plurality of spring controlled tumblers 29, arranged in sockets 30 and which are adapted to engage in the element 27 to lock the same from turning, whereby the elements of the faucet will be locked.

The key 31, which is illustrated by way of example, associates with the element 27, for the purpose of depressing the tumblers 29, to release the element 27, so that the latter can be turned or revolved for the purpose of releasing the faucet. The element 27 is grooved as at 32, 33, for the entrance of the key 31, to depress the tumblers 29 to release the element 27. The outer portion 16, of the faucet, is formed with a transversely extending bore 34 which intersects the top of the socket 24 near the inner end thereof, and associated with the bore 34, is a cylindrical groove 35 provided in the periphery of the element 27 at the inner end thereof, so that when the element 27 is revolved, to the position shown in Figure 7, the groove 35 will associate with a bore 34, and provide a clearance for a purpose to be hereinafter referred to. The inner end of the element 27 is formed with a pocket 36 for the reception of the squared shank 37 of a valve stem 38. The shape of the pocket 36 conforms in contour to the shape of the squared shank 37, whereby when the element 27 is revolved or turned, the valve stem 38 will be carried therewith. Projecting rearwardly from the inner end of the element 27 is a pair of diametrically opposed studs 39 which engage the oppositely disposed arms 40, projecting from the square collar 41, mounted on the shank 37, and by this arrangement it provides an additional means for the shifting of the valve stem 38 when the element 27 is revolved or turned.

The inner portion 18, of the faucet is in the form of a tapered plug and is provided with peripheral threads 42, and peripheral flat faces 43, these latter being adapted to associate with a suitable tool for screwing the faucet in the container or receptacle 12, through the opening 15. The inner end, of the inner portion 18 of the faucet is bevelled to provide a valve seat, as at 44. The valve stem 38 is cylindrical, and formed at its outer end with the reduced shank 37 and at its inner end with the reduced tubular extension 49 to provide a shoulder 50. The valve stem 38 at its outer portion is threaded, for engagement with the threads of the wall of the bore 26 and under such conditions, when the element 27 is turned or revolved, the valve stem 38 can be shifted or adjusted to the desired position. Mounted on the extension 49 and abutting against the shoulder 50 is a valve head 52, which associates with the seat 44. Positioned against the valve head 52 and mounted on the extension 49 is a washer 53, having bearing thereagainst a coiled spring 54, which is interposed between a nut 55, and the washer 53. The nut 55 is secured to the rear end of the extension 49. Secured to the valve 52 and projecting rearwardly therefrom is a cap member 56 which incloses the inner end of the extension 49 and the washer 53, spring 54 and nut 55. The valve head 52 is employed to control the discharge of the liquid 13 from the container or receptacle 12, as is obvious.

The retainer, employed to secure the faucet to the container or receptacle 12, after the faucet has been attached by the threads 42, consists of a curved bar 57 which is positioned against the container or receptacle 12, over the inner portion 18 of the faucet, and the said curved bar 57 has struck therefrom, a plurality of securing lugs 58 which engage in the body of the container or receptacle 12, as illustrated in Figure 2. The curved bar 57 is wide and has each end provided with an outwardly extending apertured flange 59, for the purpose of supporting the inner section 60 of a securing element for the bar 57. The inner section of the securing element is angle shape and has one of its legs mounted in the flanges 59 and formed with threads 61 on which is mounted a nut 62. The leg of the inner section 60 of the securing element, which is mounted in the flanges 59, is of greater length than the other leg. The outer section of the securing element is indicated at 63 and is also of angle shape. The sections 60 and 63 are tubular and the shorter leg of the section 60 is adjustably connected, as at 64, to the longer leg of the section 63. The shorter leg of the section 63 is formed with a cut-away portion 65 forming a pocket, for a purpose to be presently referred to. The shorter leg of the section 63 is extended through the bore 34, so that the pocket 65 in said shorter leg will be positioned at the bottom of the socket 24. The pocket 65, is adapted to receive a part of the element 27 whereby the said section 63 is locked, so that the securing elements of the retainer prevent removal of the bar 57 and secures the faucet to the container or receptacle 12, to prevent the removal of the faucet. When the element 27 is turned or revolved to position the groove 35 opposing the pocket 65, the section 63 of the securing element of the retainer can be removed from the outer portion 16 of the faucet, whereby the said securing element can be disconnected from the container or receptacle 12 and the faucet can then be unscrewed or removed. The securing element of the retainer is adjustable to provide for the employment thereof with different lengths of faucets or to provide for the projecting portion of the faucet being of different lengths, that is to say, that part of the faucet which projects from the container or receptacle 12.

In the modification shown in Figure 9, which resides solely in the valved construction of the faucet, a sleeve 45 is employed which projects rearwardly from the valve seat 44, and said sleeve 45, in proximity to seat 44 is formed with openings 46, for the passage of the liquid 13 from the container or receptacle 12, when the valve 45' is shifted from the seat 44. The valve 45' is carried on the extension 49' and abuts against the shoulder 50' on the valve stem 38. On the extension 49' is arranged a washer 53', a coiled spring 54' and a nut 55', similar to that set forth in Figure 3. Secured to the valve 45' and projecting rearwardly therefrom, is a cap member 48, which opposes the extension 49' and the elements carried thereby. The cap member 48 is arranged within the sleeve 45, and the latter has its inner end provided with a closure 47 which has threaded engagement with the sleeve 45.

What I claim is:—

1. A combined faucet and retainer therefor comprising a faucet body having means for detachably connecting it to a container and further having a discharge passage leading from its rear end and terminating inwardly with respect to its outer end, a valve for closing the rear end of said passage, a valve shifting mechanism concealed within and shiftable lengthwise of said body and carrying said valve, a retainer secured to the container to which said body is attached to prevent the removal of the latter, said retainer including a securing element having one end extended through said body outwardly with respect to said mechanism, and a key operated locking mechanism mounted in the outer end of said body and common to said shifting mechanism and the said end of said element and providing means to prevent the release of the shifting mechanism and the retainer, said mechanisms having associated means for operating said shifting mechanism to open and close said valve.

2. A combined faucet and retainer therefor comprising a faucet body having means for detachably connecting it to a container and further having a discharge passage leading from its rear end and terminating inwardly with respect to its outer end, a valve for closing the rear end of said passage, a valve shifting mechanism concealed within and shiftable lengthwise of said body and carrying said valve, a retainer secured to the container to which said body is attached to prevent the removal of the latter, said retainer including a securing element having one end extended through said body outwardly with respect to said mechanism, and a key operated locking mechanism mounted in the outer end of said body and common to said shifting mechanism and the said end of said element and providing means to prevent the release of the shifting mechanism and the retainer, said mechanisms having associated means for operating said shifting mechanism to open and close said valve, and said shifting mechanism threadingly engaging with said body.

3. A combined faucet and retainer therefor comprising a faucet body having means for detachably connecting it to a container and further having a discharge passage leading from its rear end and terminating inwardly with respect to its outer end, a valve for closing the rear end of said passage, a valve shifting mechanism concealed within and shiftable lengthwise of said body and carrying said valve, a retainer secured to the container to which said body is attached to prevent the removal of the latter, said retainer including a securing element having one end extended through said body outwardly with respect to said mechanism, a key operated locking mechanism mounted in the outer end of said body and common to said shifting mechanism and the said end of said element and providing means to prevent the release of the shifting mechanism and the retainer, said mechanisms having associated means for operating said shifting mechanism to open and close said valve, and said locking mechanism having means to permit of the withdrawal of said end of said retainer.

4. A combined faucet and retainer therefor comprising a faucet body having means for detachably connecting it to a container and further having a discharge passage leading from its rear end and terminating inwardly with respect to its outer end, a valve for closing the rear end of said passage, a valve shifting mechanism concealed within and shiftable lengthwise of said body and carrying said valve, a retainer secured to the container to which said body is attached to prevent the removal of the latter, said retainer including a securing element having one end extended through said body outwardly with respect to said mechanism, a key operated locking mechanism mounted in the outer end of said body and common to said shifting mechanism and the said end of said element and providing means to prevent the release of the shifting mechanism and the retainer, said mechanisms having associated means for operating said shifting mechanism to open and close said valve, said locking mechanism having means to permit of the withdrawal of said end of said retainer, and said shifting mechanism threadingly engaging with said body.

5. A combined faucet and retainer therefor comprising a faucet body having means for detachably connecting it to a container and further having a discharge passage leading from its rear end and terminating inwardly with respect to its outer end, a valve for closing the rear end of said passage, a valve shifting mechanism concealed within and shiftable lengthwise of said body and carrying said valve and further having a portion thereof threadingly engaging with said body, a retainer secured to the container to which said body is attached to prevent the removal of the latter, said retainer including a securing element having an angularly disposed end extended through said body outwardly with respect to said mechanism, and a key operated locking mechanism rotatably secured in the outer part of said body outwardly with respect to said shifting mechanism and common to the said end of said element and said shifting mechanism to prevent the release of the latter and the retainer, said mechanisms having associated means for operating said shifting mechanism to open and close the valve.

6. A combined faucet and retainer therefor comprising a faucet body having means for detachably connecting it to a container and further having a discharge passage leading from its rear end and terminating inwardly with respect to its outer end, a valve for closing the rear end of said passage, a valve shifting mechanism concealed within and shiftable lengthwise of said body and carrying said valve and further having a portion thereof threadingly engaging with said body, a retainer secured to the container to which said body is attached to prevent the removal of the latter, said retainer including a securing element having an angularly disposed end extended through said body outwardly with respect to said mechanism, and a key operated locking mechanism rotatably secured in the outer part of said body outwardly with respect to said shifting mechanism and common to the said end of said element and said shifting mechanism to prevent the release of the latter and the retainer, said mechanisms having associated means for operating said shifting mechanism to open and close the valve, and said locking mechanism provided with means to provide for the removal of the angle shaped end of said retainer from said body.

7. A combined faucet and retainer therefor comprising a faucet body having means for detachably connecting it to a container and further having a discharge passage leading from its rear end and terminating inwardly with respect to its outer end, a valve for closing the rear end of said passage, a valve shifting mechanism concealed within and shiftable lengthwise of said body and carrying said valve and further having a portion thereof threadingly engaging with said body, a retainer secured to the container to which said body is attached to prevent the removal of the latter, said retainer including a securing element having an angularly disposed end extended through said body outwardly with respect to said mechanism, and a key operated locking mechanism rotatably secured in the outer part of said body outwardly with respect to said shifting mechanism and common to the said end of said element and said shifting mechanism to prevent the release of the latter and the retainer, said mechanisms having associated means for operating said shifting mechanism to open and close the valve, and said locking mechanism provided with means to provide for the removal of the angle shaped end of said retainer from said body, said locking mechanism and said body provided with means to prevent the shifting of the locking mechanism lengthwise with respect to said body.

In testimony whereof, I affix my signature hereto.

ARTHUR SPEIZER.